US008624878B2

(12) United States Patent  (10) Patent No.: US 8,624,878 B2
Sarwar et al. (45) Date of Patent: Jan. 7, 2014

(54) PIEZO-BASED ACOUSTIC AND CAPACITIVE DETECTION

(75) Inventors: Mushtaq A. Sarwar, San Jose, CA (US); Omar Sze Leung, Palo Alto, CA (US); Aleksandar Pance, Saratoga, CA (US); Brett Bilbrey, Sunnyvale, CA (US); Andrew Ross Richardson, Ann Arbor, MI (US)

(73) Assignee: Apple Inc., Cupertino, CA (US)

( * ) Notice: Subject to any disclaimer, the term of this patent is extended or adjusted under 35 U.S.C. 154(b) by 822 days.

(21) Appl. No.: 12/690,907

(22) Filed: Jan. 20, 2010

(65) Prior Publication Data

US 2011/0175813 A1    Jul. 21, 2011

(51) Int. Cl.
*G06F 3/043* (2006.01)
*G06F 3/041* (2006.01)
*G06F 3/044* (2006.01)
*G06F 3/045* (2006.01)

(52) U.S. Cl.
USPC ........ 345/177; 345/173; 345/174; 178/18.01; 178/18.04; 178/18.05; 178/18.06

(58) Field of Classification Search
USPC ................... 345/156–184; 178/18.01–18.11, 178/19.01–19.07, 20.01–20.04
See application file for complete search history.

(56) References Cited

U.S. PATENT DOCUMENTS

| | | |
|---|---|---|
| 3,783,394 A | 1/1974 | Avery |
| 3,883,861 A | 5/1975 | Heartz |
| 4,066,855 A | 1/1978 | Zenk |
| 4,085,302 A | 4/1978 | Zenk et al. |
| 4,310,840 A | 1/1982 | Williams et al. |
| 4,369,439 A | 1/1983 | Broos |
| 4,506,354 A | 3/1985 | Hansen |
| 4,539,554 A | 9/1985 | Jarvis et al. |
| 5,008,497 A | 4/1991 | Asher |
| 5,059,959 A | 10/1991 | Barry |

(Continued)

FOREIGN PATENT DOCUMENTS

| | | |
|---|---|---|
| CN | 201898231 | 7/2011 |
| EP | 1827057 | 8/2007 |

(Continued)

OTHER PUBLICATIONS

Chen et al., U.S. Appl. No. 13/186,238, filed Jul. 19, 2011.

(Continued)

*Primary Examiner* — Gene W Lee
(74) *Attorney, Agent, or Firm* — David C. Kellogg (57) ABSTRACT

One particular implementation conforming to aspects of the present disclosure takes the form of an input device for a computing system. The input device includes a input surface on which one or more input characters are shown and one or more sensors to detect which input character is pressed or selected by the user. In one example, the input device may include one or more piezo-electric sensors that detect an acoustic pulse created when the user taps on the input surface to indicate a selected input. Each character of the input surface of the input device creates a different acoustic pulse signature when tapped such that, upon detection and receiving of the acoustic pulse at the piezo-electric sensors, the input device or computer system may compare the received pulse to a database of stored pulse signatures to determine which character on the surface of the input device was tapped by the user.

17 Claims, 8 Drawing Sheets

(56) References Cited

U.S. PATENT DOCUMENTS

| | | | |
|---|---|---|---|
| 5,317,105 A | 5/1994 | Weber | |
| 5,342,991 A | 8/1994 | Xu et al. | |
| 5,483,261 A | 1/1996 | Yasutake | |
| 5,488,204 A | 1/1996 | Mead et al. | |
| 5,770,898 A | 6/1998 | Hannigan et al. | |
| 5,825,352 A | 10/1998 | Bisset et al. | |
| 5,835,079 A | 11/1998 | Shieh | |
| 5,854,450 A * | 12/1998 | Kent | 178/18.04 |
| 5,880,411 A | 3/1999 | Gillespie et al. | |
| 5,959,612 A | 9/1999 | Breyer et al. | |
| 5,975,953 A | 11/1999 | Peterson | |
| 5,986,224 A * | 11/1999 | Kent | 178/18.04 |
| 6,067,074 A | 5/2000 | Lueders | |
| 6,130,663 A | 10/2000 | Null | |
| 6,188,391 B1 | 2/2001 | Seely et al. | |
| 6,198,470 B1 | 3/2001 | Agam et al. | |
| 6,278,888 B1 | 8/2001 | Gillespie et al. | |
| 6,310,610 B1 | 10/2001 | Beaton et al. | |
| 6,313,825 B1 | 11/2001 | Gilbert | |
| 6,323,846 B1 | 11/2001 | Westerman et al. | |
| 6,337,678 B1 | 1/2002 | Fish | |
| 6,396,484 B1 * | 5/2002 | Adler et al. | 345/177 |
| 6,429,846 B2 | 8/2002 | Rosenberg et al. | |
| 6,473,075 B1 * | 10/2002 | Gomes et al. | 345/177 |
| 6,504,530 B1 * | 1/2003 | Wilson et al. | 345/173 |
| 6,630,929 B1 * | 10/2003 | Adler et al. | 345/177 |
| 6,690,387 B2 | 2/2004 | Zimmerman et al. | |
| 6,713,672 B1 | 3/2004 | Stickney | |
| 6,723,937 B2 | 4/2004 | Englemann et al. | |
| 6,741,237 B1 * | 5/2004 | Benard et al. | 345/173 |
| 6,800,805 B2 | 10/2004 | Deguchi | |
| 6,803,245 B2 | 10/2004 | Auch et al. | |
| 6,879,319 B2 | 4/2005 | Cok | |
| 6,987,466 B1 | 1/2006 | Welch et al. | |
| 7,006,078 B2 | 2/2006 | Kim | |
| 7,015,894 B2 | 3/2006 | Morohoshi | |
| 7,034,913 B2 | 4/2006 | Ishida | |
| 7,075,793 B2 | 7/2006 | Le et al. | |
| 7,109,978 B2 | 9/2006 | Gillespie et al. | |
| 7,113,196 B2 | 9/2006 | Kerr | |
| 7,125,287 B1 | 10/2006 | Chou et al. | |
| 7,184,064 B2 | 2/2007 | Zimmerman et al. | |
| 7,188,989 B2 | 3/2007 | Miyashita | |
| 7,242,395 B2 | 7/2007 | Kurashima et al. | |
| 7,324,093 B1 | 1/2008 | Gettemy et al. | |
| 7,345,677 B2 | 3/2008 | Ing et al. | |
| 7,411,581 B2 | 8/2008 | Hardie-Bick | |
| 7,470,866 B2 | 12/2008 | Dietrich et al. | |
| 7,473,139 B2 | 1/2009 | Barringer et al. | |
| 7,511,711 B2 | 3/2009 | Ing et al. | |
| 7,532,202 B2 * | 5/2009 | Roberts | 345/173 |
| 7,541,671 B2 | 6/2009 | Foust et al. | |
| 7,575,481 B1 | 8/2009 | Liu | |
| 7,620,316 B2 | 11/2009 | Boillot | |
| 7,656,393 B2 | 2/2010 | King et al. | |
| 7,663,607 B2 | 2/2010 | Hotelling et al. | |
| 7,710,397 B2 | 5/2010 | Krah | |
| 7,714,801 B2 | 5/2010 | Kimmel | |
| 7,725,288 B2 | 5/2010 | Boillot | |
| 7,816,838 B2 | 10/2010 | Leskinen et al. | |
| 7,834,451 B2 | 11/2010 | Lee et al. | |
| 7,834,855 B2 | 11/2010 | Hotelling et al. | |
| 7,844,310 B2 | 11/2010 | Anderson | |
| RE42,199 E | 3/2011 | Caldwell | |
| 7,920,223 B2 | 4/2011 | Nishizawa et al. | |
| 8,018,440 B2 * | 9/2011 | Townsend et al. | 345/173 |
| 8,068,635 B2 | 11/2011 | Carlson et al. | |
| 8,098,233 B2 | 1/2012 | Hotelling et al. | |
| 8,189,851 B2 | 5/2012 | Booth et al. | |
| 8,319,740 B2 * | 11/2012 | Kimura et al. | 345/173 |
| 2003/0164820 A1 * | 9/2003 | Kent | 345/177 |
| 2004/0001137 A1 | 1/2004 | Cutler et al. | |
| 2004/0164970 A1 * | 8/2004 | Benard et al. | 345/173 |
| 2004/0238195 A1 | 12/2004 | Thompson | |
| 2005/0212775 A1 * | 9/2005 | Lee | 345/173 |
| 2005/0212777 A1 | 9/2005 | Ing et al. | |
| 2005/0226455 A1 | 10/2005 | Aubauer et al. | |
| 2006/0026521 A1 | 2/2006 | Hotelling et al. | |
| 2006/0042820 A1 | 3/2006 | Lin et al. | |
| 2006/0044259 A1 | 3/2006 | Hotelling et al. | |
| 2006/0132025 A1 | 6/2006 | Gao et al. | |
| 2006/0197753 A1 | 9/2006 | Hotelling | |
| 2006/0279548 A1 * | 12/2006 | Geaghan | 345/173 |
| 2006/0290677 A1 | 12/2006 | Lyon et al. | |
| 2007/0132743 A1 * | 6/2007 | Bayramoglu | 345/177 |
| 2007/0165009 A1 * | 7/2007 | Sakurai et al. | 345/177 |
| 2007/0182722 A1 | 8/2007 | Hotelling et al. | |
| 2008/0084404 A1 | 4/2008 | Andre et al. | |
| 2008/0103637 A1 | 5/2008 | Bliven et al. | |
| 2008/0238725 A1 | 10/2008 | Gitzinger et al. | |
| 2009/0002199 A1 | 1/2009 | Lainonen et al. | |
| 2009/0002328 A1 | 1/2009 | Ulrich et al. | |
| 2009/0015747 A1 | 1/2009 | Nishizawa et al. | |
| 2009/0052715 A1 | 2/2009 | Zhang et al. | |
| 2009/0082103 A1 | 3/2009 | Lube | |
| 2009/0097691 A1 | 4/2009 | Eaton | |
| 2009/0161048 A1 | 6/2009 | Satake et al. | |
| 2009/0167171 A1 | 7/2009 | Jung et al. | |
| 2009/0173533 A1 | 7/2009 | Brock et al. | |
| 2009/0173534 A1 | 7/2009 | Keiper et al. | |
| 2009/0176391 A1 | 7/2009 | Brock et al. | |
| 2009/0201443 A1 | 8/2009 | Sasaki et al. | |
| 2009/0228142 A1 * | 9/2009 | Levasseur et al. | 700/232 |
| 2009/0244836 A1 | 10/2009 | Leng et al. | |
| 2009/0256471 A1 | 10/2009 | Kim et al. | |
| 2009/0256817 A1 * | 10/2009 | Perlin et al. | 345/174 |
| 2010/0006845 A1 | 1/2010 | Seo et al. | |
| 2010/0026952 A1 | 2/2010 | Miura et al. | |
| 2010/0044067 A1 | 2/2010 | Wong et al. | |
| 2010/0045705 A1 | 2/2010 | Vertegaal et al. | |
| 2010/0052521 A1 | 3/2010 | Kim et al. | |
| 2010/0110041 A1 | 5/2010 | Jang | |
| 2010/0122439 A1 | 5/2010 | Britton et al. | |
| 2010/0238367 A1 | 9/2010 | Montgomery et al. | |
| 2010/0238612 A1 | 9/2010 | Hsiao et al. | |
| 2010/0265187 A1 | 10/2010 | Chang et al. | |
| 2010/0301755 A1 | 12/2010 | Pance et al. | |
| 2010/0306683 A1 | 12/2010 | Pance et al. | |
| 2010/0315399 A1 | 12/2010 | Jacobson et al. | |
| 2011/0037624 A1 | 2/2011 | Pance et al. | |
| 2011/0037734 A1 * | 2/2011 | Pance et al. | 345/177 |
| 2011/0038114 A1 | 2/2011 | Pance et al. | |
| 2011/0043227 A1 | 2/2011 | Pance et al. | |
| 2011/0050586 A1 * | 3/2011 | Miller et al. | 345/173 |
| 2011/0086680 A1 | 4/2011 | Kim et al. | |
| 2011/0119973 A1 | 5/2011 | Andre et al. | |
| 2011/0242001 A1 * | 10/2011 | Zhang et al. | 345/173 |
| 2011/0310028 A1 * | 12/2011 | Camp et al. | 345/173 |
| 2012/0068973 A1 * | 3/2012 | Christiansson et al. | 345/175 |
| 2012/0081337 A1 * | 4/2012 | Camp et al. | 345/177 |
| 2012/0105358 A1 * | 5/2012 | Momeyer et al. | 345/174 |
| 2012/0111479 A1 | 5/2012 | Musser et al. | |
| 2012/0127087 A1 | 5/2012 | Ma | |
| 2012/0211148 A1 | 8/2012 | Patel et al. | |
| 2012/0218219 A1 | 8/2012 | Rappoport et al. | |
| 2012/0293551 A1 * | 11/2012 | Momeyer et al. | 345/633 |

FOREIGN PATENT DOCUMENTS

| | | |
|---|---|---|
| EP | 2202624 | 6/2010 |
| JP | 58112263 | 7/1983 |
| JP | 20000163031 | 6/2000 |
| JP | 2002342033 | 11/2002 |
| WO | 0174114 | 10/2001 |
| WO | 02095342 | 11/2002 |
| WO | 2005083547 | 9/2005 |
| WO | 2007/083894 | 6/2007 |
| WO | 2007082114 | 7/2007 |

OTHER PUBLICATIONS

Drzaic et al., U.S. Appl. No. 13/252,971, filed Oct. 4, 2011.
Franklin et al., U.S. Appl. No. 13/250,227, filed Sep. 30, 2011.
Franklin et al., U.S. Appl. No. 13/250,666, filed Sep. 30, 2011.

(56) References Cited

OTHER PUBLICATIONS

Franklin et al., U.S. Appl. No. 13/310,409, filed Dec. 2, 2011.
Franklin et al., U.S. Appl. No. 13/422,724, filed Mar. 16, 2012.
Lynch, U.S. Appl. No. 13/184,303, filed Jul. 15, 2011.
Martisauskas et al., U.S. Appl. No. 13/229,120, filed Sep. 9, 2011.
Myers et al., U.S. Appl. No. 13/108,256, filed May 16, 2011.
Myers et al., U.S. Appl. No. 13/246,510, filed Sep. 27, 2011.
Raff et al., U.S. Appl. No. 13/452,061, filed Apr. 20, 2012.
Rappoport et al., U.S. Appl. No. 13/249,734, filed Sep. 30, 2011.
Rappoport et al., U.S. Appl. No. 13/273,851, filed Oct. 14, 2011.
Rothkopf et al, U.S. Appl. No. 13/177,165, filed Jul. 6, 2011.
Takamatsu et al., "Transparent conductive-polymer strain sensors for touch input sheets of flexible displays" Journal of Micromechanics and Microengineering, J. Micromech. Microeng. 20 (2010) 075017 (6pp).
Bhattacharya et al., "Organic LED Pixel Array on a Dome" The IEEE, vol. 93, No. 7, Jul. 2005.
Stedmon et al., "Sound and Tangible Interfaces for Novel product design" Satin, Nov. 2007.
Wagner et al., "Flexible thin-film transistor backplanes" Department of Electrical Engineering, and Princeton Institute for the Science and Technology of Materials.
Sugimoto et al., "Loudspeakers for flexible displays," Acoust. Sci. & Tech., Japan, Jan. 12, 2012, vol. 30, 2, (pp. 151-153).
Kwon et al., "Haptic Interferences for Mobile Devices: a Survey of the State of the Art," Telerobotics and Control Laboratory, KAIST (Korea Advanced Institute of Science and Technology, Korea, Dec. 11, 2007.

* cited by examiner

FIG. 10

PIEZO-BASED ACOUSTIC AND CAPACITIVE DETECTION

TECHNICAL FIELD

Embodiments relate generally to computing input devices, and more specifically to one or more piezo-based acoustic and capacitive sensors to detect key taps on an input device.

BACKGROUND

Many electronic devices have a keyboard or similar input device with which a user interacts to provide an input to an electronic or computing device. Most keyboards consist of an arrangement of buttons that act as mechanical buttons or switches that are pushed by the user to provide input to the computing device. Each key of the keyboard typically has an engraved or printed character on the key that corresponds to the symbol that is input to the computer when the particular key is pressed by the user. In some situations, several keys may be pressed simultaneously or in sequence to produce actions or commands for the computing device.

Some keyboards and other computing input devices have done away with mechanical switches and instead employ a touch-sensitive surface input. One example of a touch-sensitive surface input device is a touch screen, such as those found at automatic teller machines (ATMs) or on personal digital assistants (PDAs), mobile phones, tablet computing devices and other mobile computing devices. To provide an input using a touch screen, the user presses or touches a surface with either the user's finger or a stylus device. The input device senses the touch, determines its location on the touch screen and generates the corresponding input. Thus, the position of the user's finger is determined by the touch screen and the corresponding command is inputted to the electronic device. Other touch-sensitive surface input devices may employ materials other than glass, such as a metal or plastic.

In general, touch-sensitive surface or related input devices may be less reliable in determining a pressed command or intended input when compared with a traditional mechanical keyboard. For example, some touch screens often require that a user tap on the screen several times before detecting the command. Further, touch-sensitive surface input devices often fail to distinguish between when a user is merely resting on the surface of the device or actively selecting a letter or other input.

SUMMARY

One embodiment may take the form of an input device for a computing system. The input device may comprise a capacitive sensor configured to detect a location of an input to the input device and a piezoelectric sensor configured to detect an acoustic signature created from the input. Further, the acoustic signature may be compared to a database of reference acoustic signatures that indicate the location of the input to the input device.

Another embodiment may take the form of a method for detecting an input to an input device of a computing system. The method may comprise the operations of receiving a first acoustic pulse at a first piezoelectric sensor and comparing the first acoustic pulse to a first database comprising a plurality of first reference acoustic signatures to determine the location of the input. In addition, the method may comprise the operations of receiving a second acoustic pulse at a second piezoelectric sensor and comparing the second acoustic pulse to a second database comprising a plurality of second reference acoustic signatures to determine the location of the input.

Yet another embodiment may take the form of a computing system. The computing system may comprise an input device including an input surface and configured to receive an input to the computing system from a user and a computer-readable storage device configured to store a database of reference acoustic signatures. The computing system may also include a capacitive sensor configured to detect a location of the input on the input surface and a piezoelectric sensor configured to detect the at least one acoustic signature representing the input, such that the detected at least one acoustic signature is compared to the database to determine the location of the input.

DETAILED DESCRIPTION OF THE INVENTION

One embodiment described herein takes the form of an input device for a computing system, such as a keyboard of a computer system or a touch screen for a mobile computing device. The input device includes an input surface on which one or more input characters are shown, such that a user may press or tap on the character to provide an input corresponding to that character to the computing system. The input device may also include one or more sensors to detect which input character is pressed or otherwise selected by the user. In one example, the input device may have one or more acoustic sensors that detect an acoustic pulse created when the user taps on the input surface to indicate a selected key. Each input area on the surface of the input device creates a different acoustic pulse signature when tapped, given the internal geometry and physical characteristics of the device. Thus, upon receipt and detection of the acoustic pulse at the acoustic sensors, the input device (or associated computing device) may compare the received pulse to a database of stored pulse signatures in order to determine what segment of the surface of the input device was tapped by the user. Such detection may be sufficiently precise to map the tap to a particular key of keyboard, for example.

Several other features may be incorporated into the input device to further determine which segment of the input device is tapped by the user. For example, one or more tuning features may be situated near or on the input device to alter the acoustic pulse created when a particular segment of the input device is tapped. These tuning features may create a new acoustic signature for one or more segment of the input device to assist the computer system in differentiating between the taps on the segments of the input device. Additional sensors may also be incorporated to assist the computing system or input device in determining which segment of the input device is pressed by the user. For example, a capacitive sensor may be incorporated into the input device to narrow the list of possible intended segments of the input device tapped by the user, as well as to determine when the user is continually pressing on a particular segment or otherwise maintaining an input. One or more pressure switches and/or proximity devices may also be incorporated to further define the segment of the input device pressed by the user. The pressure switches may also be used to detect a dampening force present on the input device that may alter the resultant acoustic signature from a particular tap. Through these and additional sensors, the input surface of the input device can detect and locate an input on the surface of the device and provide a corresponding input to a computing system.

Figure 1:
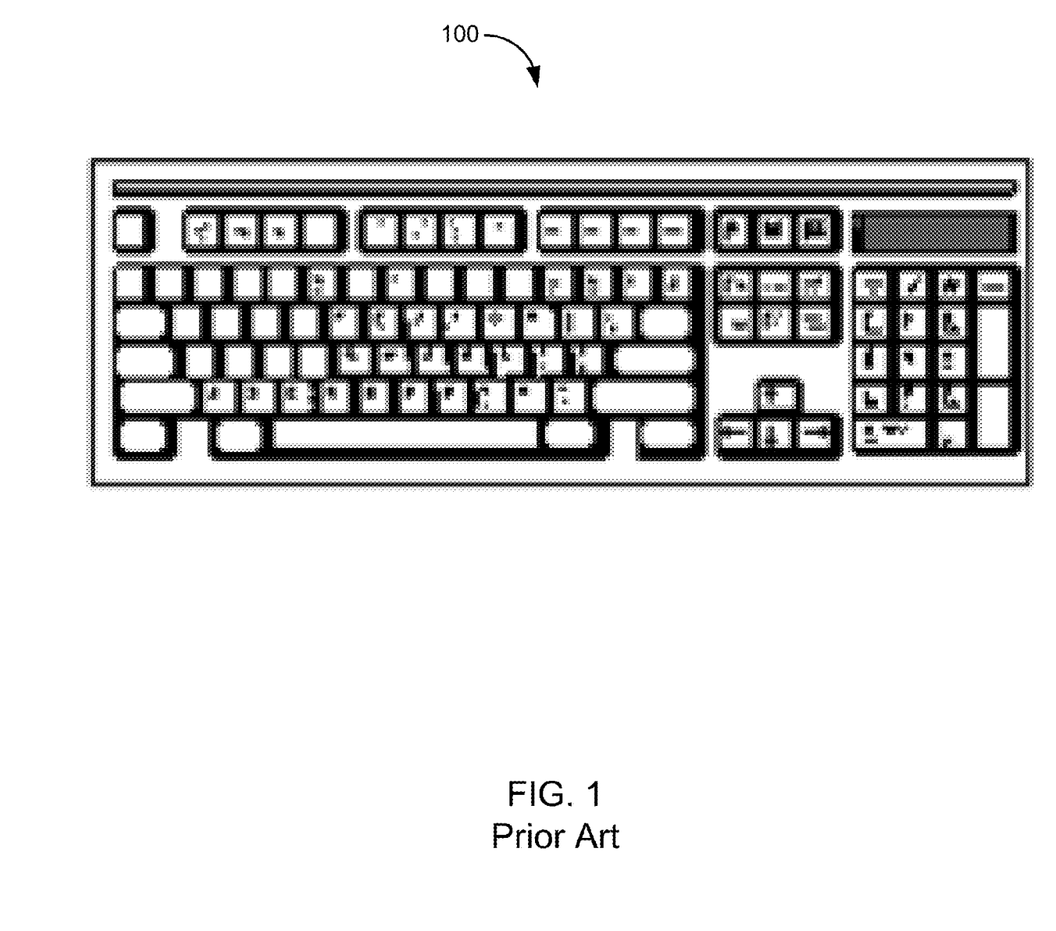
FIG. 1 depicts a top view of an input device for a computing device.

FIG. 1 depicts a top view of a mechanical-based keyboard 100 for a computing device. As described above, the keyboard may be utilized to provide an input to a computing system such that a user may interact with the computing system. The keyboard 100 shown includes several keys arranged as buttons that act as mechanical buttons or switches. Each key of the keyboard typically has an engraved or printed character on the key that corresponds to the symbol that is input to the computer when the particular key is pressed by the user. As should be appreciated, for the mechanical buttons of the keyboard 100 to operate, the buttons or keys of the keyboard must move in a vertical manner when pressed by a finger of a user. This movement activates the button or switch below the keys to determine which key is pressed by the user.

In some instances, an input device for a computing system made of mechanical buttons or switches may not be feasible. For example, it may be useful to provide an input device that is flat and has few to no moving pieces, as this may yield a more robust product. One such device is a touch-based input device for a computing system. Embodiments of the present disclosure may take the form of such input devices.

Figure 2:
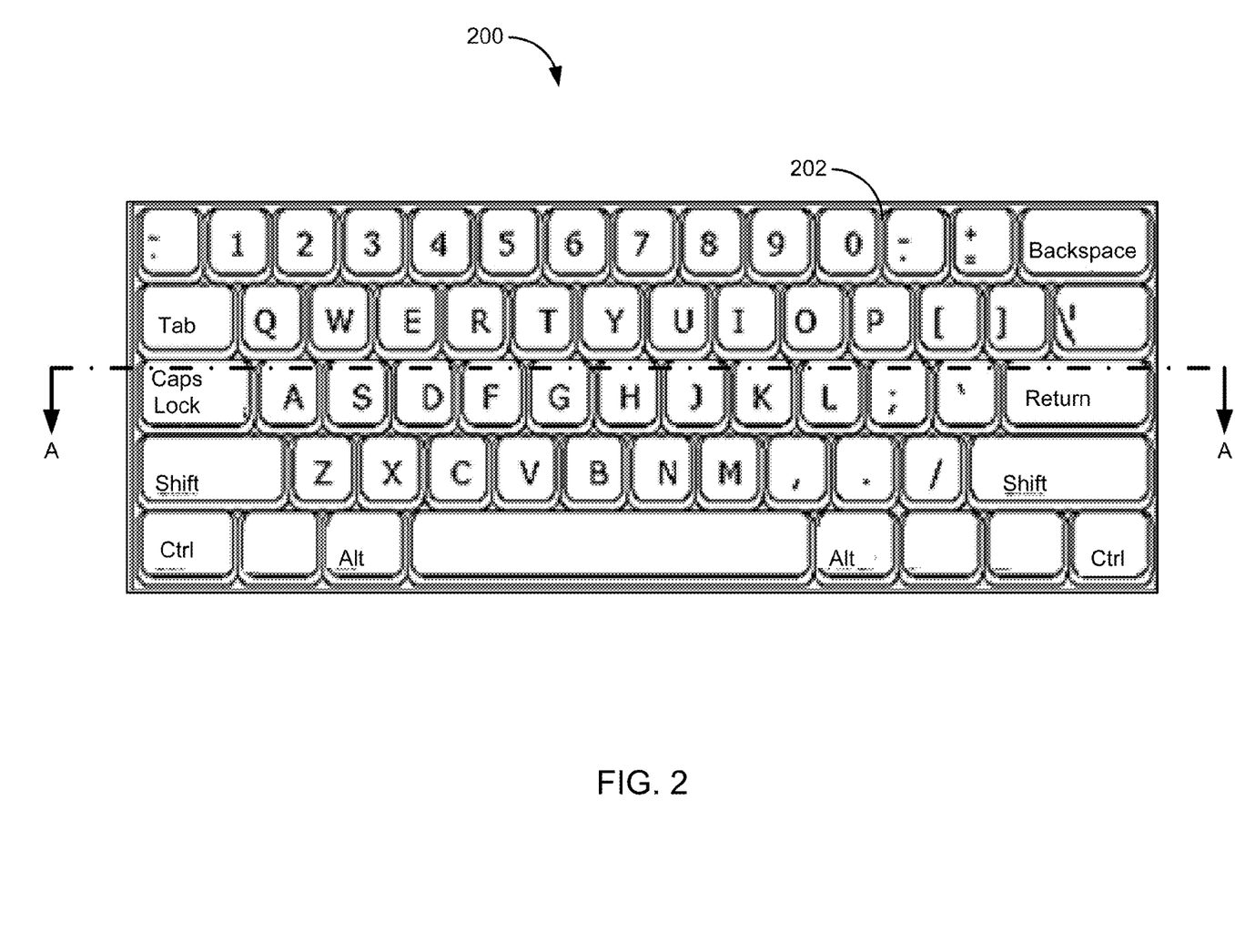
FIG. 2 is a top view of a flat-surface keyboard input device utilizing acoustic pulse recognition to detect a tap on the surface of the keyboard.

As discussed herein, one embodiment of the present disclosure may take the form of a flat surface input device with a keyboard interface similar to that shown in FIG. 1 associated with the flat surface. FIG. 2 is a top view of a flat-surface keyboard input device 200 utilizing acoustic pulse recognition to detect a tap on the surface of the keyboard. While the embodiments described herein and throughout provide for a keyboard-type input device 200, it should be appreciated that the embodiments discussed may take any form of a input-surface input device for a computing system. For example, the embodiments discussed herein may apply to a touch-screen of a mobile device or to a tablet computing system. In addition, the functions of the input devices described herein may apply to surfaces of the input device that are not flat. For example, the characteristics and functions described may also be included in a curved surface, such as that of a mouse input device. Generally, the embodiments described may apply to any type of an input device for a computing system, including but not limited to, a touch-screen, a mouse, a flat-surface keyboard, a tablet-type computing screen, and so on. The description of the embodiments below in relation to a flat surface keyboard is for convenience only and should not be considered as limiting to the present disclosure.

In addition, the computing systems described herein may be any type of computing or electronic device, such as a desktop computer, handheld computing device, personal digital assistant, mobile telephone, music or audio player (such as an MP3 player), health or medical device, auto/vehicle-mounted device, and so on. Accordingly, a "computing device" or "computing system" as used encompasses all such devices and any other electronic device having a processor for performing mathematical or computational processes.

A flat surface keyboard 200 embodiment of the present disclosure may take the form of at least one input surface 202 with some type of indicator on the surface for each of the input characters of the keyboard. The input surface 202 may be constructed from any solid material, such as metal, glass, plastic, and so on. In a metal or plastic embodiment, the keys may be machined, stamped or micro-perforated into the input surface 202 such that a user may press or tap on a key to provide a corresponding input to the computing system. In a glass embodiment, the keys may be painted on the surface 202 or provided as graphics on a display screen located below the glass surface. Generally, the keys may include any indicator that corresponds to an input to the computing system. Further, each character may be associated with a discrete area or segment of the input surface 202 that the user presses or taps to select the character for input. In the examples discussed herein, the input surface keyboard includes an indication of a standard computer keyboard layout, including space bar, enter key, function keys, and so on.

In addition to the keyboard layout on the surface 202, the keyboard 200 may also include one or more surface textures to distinguish the separate keys of the keyboard layout. For example, the characters for each key as well as the outline defining the key edges and other areas may be indented into the keyboard surface 202. Generally, the keys of the keyboard may be finished with any surface texture that distinguishes them to the touch of a user. Further, the flat surface keyboard 200 may also include a haptic or tactile feedback mechanism that is activated when the user presses or taps on a key of the keyboard. In general, the haptic response may provide a force, vibration and/or motion to the user's fingers or hands in response to the user pressing on the keyboard surface 202. For example, each key of the keyboard 200 may move or vibrate slightly when pressed, or when a user's finger or other object is sensed within a certain proximity.

Figure 3:
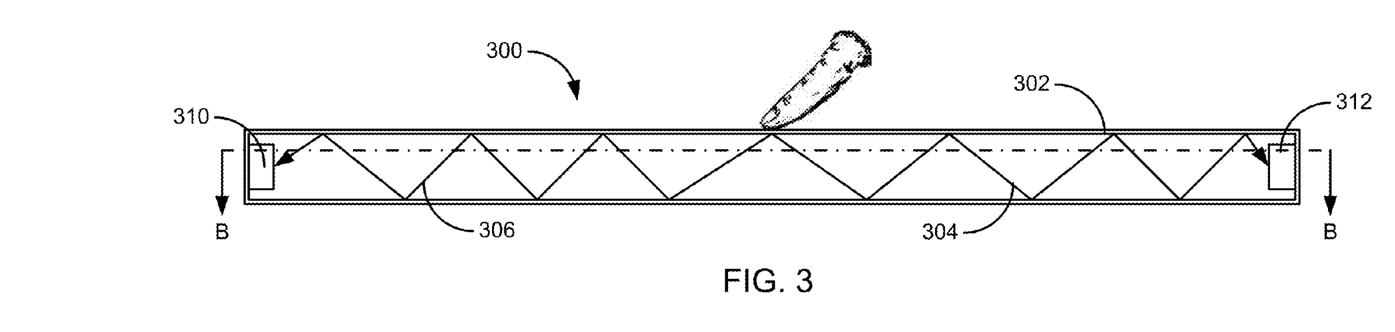
FIG. 3 depicts a cross-sectional view of the flat-surface keyboard device utilizing acoustic pulse recognition to detect a tap on the keyboard of FIG. 2 along the line marked "AA".

While the keyboard device 200 may provide a haptic response to a user input, the flat surface keyboard typically does not include mechanical switches or buttons to detect the pressing of a key. Instead, the flat surface keyboard 200 may include one or more sensors to detect when and where a user taps the keyboard during operation of the input device. In one embodiment, one or more piezo-electric sensors may be utilized to detect and record an acoustic pulse created when the user taps on the keyboard 200. FIG. 3 depicts a cross-sectional view of the flat-surface keyboard device utilizing acoustic pulse recognition to detect a tap on the keyboard of FIG. 2 along the line marked "AA". In the example shown, the keyboard 300 takes the form of a box structure with the keyboard layout located on the top surface 302 of the box. The keyboard layout provides an interface to the user and maps out the particular areas of the surface 302 that correspond to the characters of the keyboard. For example, the keyboard layout may display an area defined by a square with a character "H" located within the square. To input the character "H" to the computing device, the user taps or presses on the area defined by the square, similar to a mechanical-based keyboard. In general, the keyboard layout may include any number of defined input areas and any kind of input characters.

While the keyboard shown in FIG. 3 includes a box-like structure, it should be appreciated that the keyboard 300 may take any shape and may not necessarily be an enclosed structure. The keyboard device is shown as a box-like structure merely for convenience herein. For example, the walls of keyboard 300 may be curved or non-linear. In other embodiments, the keyboard device may have an input surface and one or more support structures or legs extending away from the input surface. In yet another embodiment, the keyboard device may be integrated into a computing system, such as a touch screen of a mobile computing device. Generally, the input device may take any shape that includes at least one surface that detects an input provided by a user on that surface.

Figure 3A:
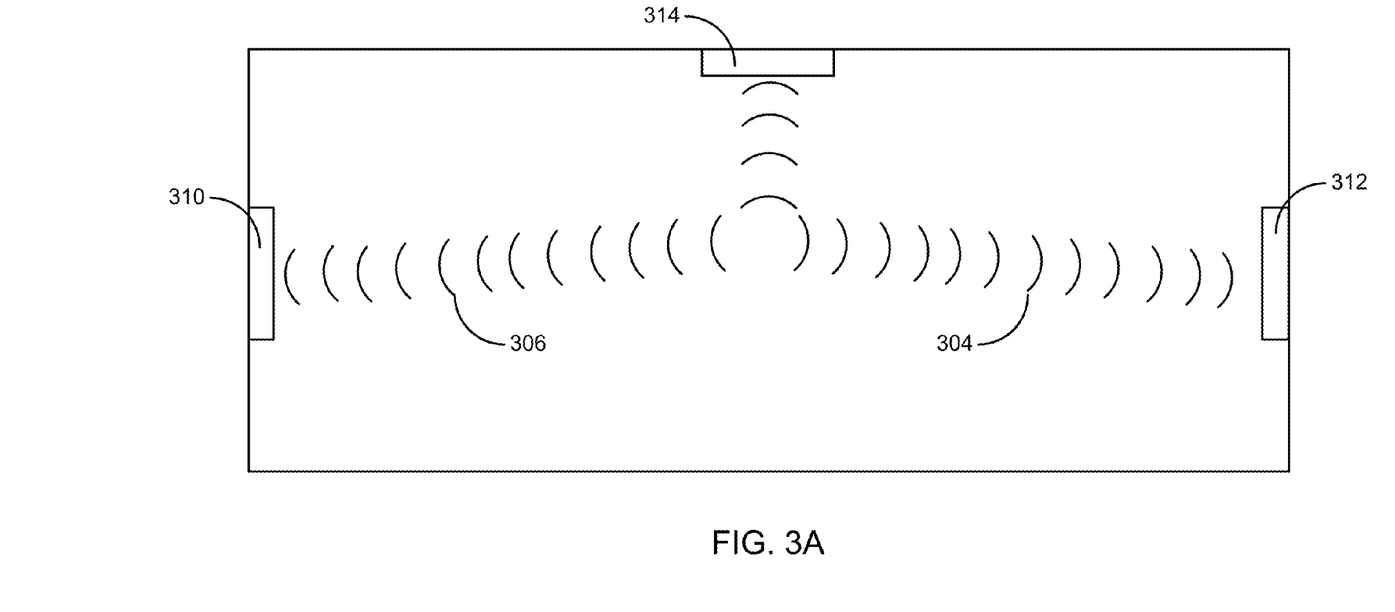
FIG. 3A depicts a cross-sectional top view of the keyboard device of FIG. 3 along line designated "BB" that utilizes three piezo sensors 310-314 to detect an acoustic pulse recognition of a tap on the keyboard surface 302.

In the example shown in FIG. 3, two piezo-electric ("piezo") sensors 310, 312 are arranged within the keyboard structure 300, one on the left sidewall of the keyboard structure and the other on the right sidewall of the structure. The piezo sensors 310, 312 are situated to receive an acoustic pulse created when the user taps a segment or segments of the top surface 302 of the keyboard device 300. While the example shown includes two piezo sensors 310, 312, other embodiments of an input device may include any number of piezo sensors. For example, FIG. 3A depicts a cross-sectional top view of the keyboard device of FIG. 3 along line "BB" that utilizes three piezo sensors 310-314 to detect an acoustic pulse recognition of a tap on the keyboard surface 302. Further, it is not required that the piezo sensors 310, 312 be located on the sidewalls of the keyboard; they may be located anywhere near the keyboard in a manner such that the piezo sensors can receive the acoustic pulse that results from a tap on the surface.

While the embodiments described herein and throughout discuss piezo-electric sensors to detect the acoustic pulse resulting from a tap on the input device, it should be appreciated that the embodiments discussed may include any type of sensor that detects an acoustic signal. For example, the input device 200 may incorporate one or more microphones to detect the acoustic signal. In other embodiments, a seismometer or an accelerometer may also be used to detect the acoustic pulse created by a tap on the input device surface 202. Generally, the embodiments described may utilize any type of acoustic sensors to detect the acoustic pulse. The description of the embodiments below incorporating one or more piezoelectric sensors is for convenience only and should not be considered as limiting to the present disclosure.

During operation, a user taps on the surface 302 of the keyboard defined by the keyboard outline. For example, the user may tap on the area of the top surface 302 that includes an indication of the letter "H". When tapped, one or more acoustic pulses 304, 306 propagates away from and along the top surface 302; these pulses originate at the point tapped. For simplicity, the acoustic pulses are shown in FIG. 3 by the arrows 304, 306 propagating through the interior of the keyboard. However, it should be appreciated that the acoustic pulses propagate away from the tap in all directions. For example, as shown in FIG. 3A, the acoustic pulse may also propagate to a third piezo sensor 314 located at the back of the keyboard 300. In general, the acoustic pulse created by a tap on the surface 302 of the keyboard device 300 is a sound wave, propagating and reflecting off of surfaces as any sound wave typically does.

As the acoustic pulses 304, 306 propagate through the keyboard 300 and reflect off of the various edges and surfaces of the keyboard, an acoustic signature is created for the separate segments of the keyboard. The acoustic signature for a particular segment is received by the piezo sensors 310, 312 and converted into an electrical signal. This electrical signal may than be compared by the keyboard device 300 or an associated computing system to a database of collected reference pulses to determine which character input was tapped. In addition, the internal structure of the keyboard device 300 may affect the acoustic signature of a tap on the surface 302 of the device. The effect of the internal structure of the keyboard 300 on the acoustic signatures is discussed in more detail below with reference to FIG. 5.

In one example, the user may tap the area of the surface 302 of the keyboard 300 marked as "H" to provide that character as an input to a computing system. The tap creates an acoustic signature that is received at the piezo sensors 310, 312. The keyboard 300 or computing system then compares the received signature to a database of collected acoustic signatures to determine that the received signature indicates that the user has tapped on the keyboard surface 302 to input an "H" character. In this manner, a tap on an input surface 302 of the keyboard 300 is translated into an input to the computing system.

The database of acoustic signatures for the keyboard device 300 to which a received acoustic signal is compared may be collected and gathered in several ways. In one example, a plurality of acoustic signatures are gathered during a calibration process for the keyboard device 300. During calibration, the top surface 302 is tapped at discrete spatial intervals while the acoustic pulse received at the piezo sensors 310-314 is stored. In this manner, each individual pulse signature is associated with a particular area or segment of the keyboard device 300. Because it is known which areas of the surface 302 of the keyboard 300 is associated with which input character, the unique acoustic signatures for each input character can be stored in a database accessible by the keyboard device 300 or computing system for comparison with the received signatures during operation of the input device.

In those embodiments that incorporate a plurality of piezo sensors 310-314, the received acoustic signature at each sensor may be stored in the same or separate databases. For example, due to distance traveled and the various surface irregularities of the keyboard, the acoustic pulse received at piezo sensor 314 may be different than the acoustic pulse received at piezo sensor 310 for any given tap on the keyboard surface 302. Thus, the acoustic signature for an "H" input received at piezo sensor 312 is different from the acoustic signature for the same input at piezo sensor 310. As such, a separate database may be maintained for the acoustic signatures received at each piezo sensor. Alternatively, a single database may be maintained, and each piezo sensor may include a unique identifier that is used to cross-reference entries in the database. In such an embodiment, the sensor identifier and acoustic signature may both be used to search the database for matching or similar records.

During operation, each database may be consulted to determine which area of the surface 302 of the keyboard was tapped 300. For example, the input device 300 or computing system may compare the received acoustic pulse from a first piezo sensor 310 to a first database. This may narrow the number of possible taps performed by a user. Once narrowed, the input device 300 or computing system may compare the received acoustic pulse from a second piezo sensor 312 to a second database to acquire an accurate determination of the location of the user's tap to a particular input character. As should be appreciated, several piezo sensors 310-314 provide more accuracy in determining of the location of a tap on the surface 302 of the device 300.

The input device 300 or associated computing system may perform the comparison of the received acoustic signal to the acoustic signals maintained in the database in several ways. In one embodiment, the received acoustic signature may be compared directly to the stored acoustic signatures to determine if the received signature exactly matches the stored signature. In another embodiment, a percentage error may be considered such that, if the received signature does not match the stored signature exactly but still falls within the percentage error, the input device 300 or computing system may determine the received signature matches the stored signature. In still another embodiment, the input device 300 or computing system may determine a peak-to-peak value for the received signature and compare that to similar stored peak-to-peak values. Generally, any method for comparing a received acoustic signal to a stored acoustic signal is envisioned and may be performed by the input device 300 or associated computing system.

In addition, in those embodiments that include a plurality of piezo sensors, the difference in time between when the plurality of piezo sensors detect the tap may be utilized to determine the location of the tap, similar to a multilateration process. In this embodiment, the input device 300 or associated computing system may use the time difference of arrival of the acoustic pulse emitting from a tap on the surface 302 of the input device. By comparing the time difference of arrival at three or more piezo sensors, the input device 300 or computing system may determine a location on the surface of the device that a tap occurs. Such a determination may also be used in conjunction with the comparison of the received acoustic signatures described above to more accurately determine the location of a tap.

While piezo sensors 310-314 can detect when a key is pressed or tapped by a user, the piezo-sensors alone may not be able to detect a press-and-hold action. For example, it is occasionally required during operation of a computing device that the user hold down a shift key or other key on the keyboard to achieve a particular input. However, because the piezo sensors 310-314 detect a pressed key based on a tap on the surface 302 of the keyboard, holding down a key is typically not measured by the piezo sensors. To acquire such press-and-hold events, the keyboard device 300 may also incorporate a capacitive or other type of sensor to detect the placement and holding of a user's finger on the surface 302 of the device 300.

Figure 4:
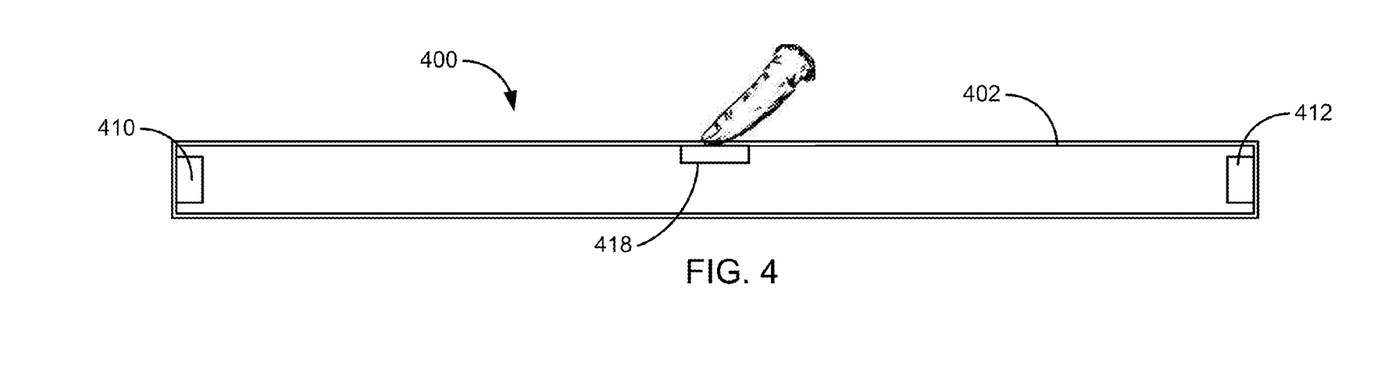
FIG. 4 depicts a cross-sectional view similar to that shown in FIG. 3 of a keyboard device that utilizes a combination of piezoelectric sensors and capacitive sensors to detect a tap on the keyboard surface.

FIG. 4 depicts a cross-section view of a keyboard device 400 utilizing a combination of piezoelectric sensors 410, 412 and at least one capacitive sensor 418 to detect a tap and press-and-hold movement on the keyboard surface 402. The keyboard 400 and piezo sensors 410, 412 may take the same structure and placement as described above with reference to FIGS. 3 and 3A. In addition, one or more capacitive sensors 418 may be located along the underside of the top surface 402 of the keyboard device 400 to further detect the position of a finger tap on the device, as well as detect when the user is performing a press-and-hold event on a particular key of the keyboard.

The capacitive sensor 418 may form a conductive layer located just beneath the top surface 402 of the keyboard 400, with a small voltage applied to the layer to create a uniform electrostatic field. Because a human finger may also act as a conductor, placing the finger on the surface 402 of the keyboard 400 above the capacitive sensor 418 may create a distortion in the capacitive field that may be measured by the capacitive sensor. This distortion in the capacitive field may be utilized by the keyboard device 400 to determine the location of the touch on the surface 402. Further, as long as the user maintains contact with the surface 402, the distortion in the capacitive field is maintained.

In an embodiment of the input device 400 that is composed of a metal, the location of a user's finger may be detected through a capacitive sensor detecting a distortion in metal surface of the input device surface 402. In this example, a distortion in the surface of the metal input device can be measured from a capacitive sensor 418 located on the input device 400. The capacitive sensor 418 may detect a distortion in the surface 402 of the input device 400 from the presence of a user's input. Thus, as the user presses on the surface of the input device 400, the capacitive sensor 418 may detect such distortion and locate such distortion similar as described herein.

The capacitive sensor 418 may be used in junction with the piezo sensors 410, 412 to provide an accurate determination of the location of a tap by the user of the flat keyboard 400 device. For example, the piezo sensors 410, 412 may be used as described above with reference to FIGS. 3 and 3A to determine which area of the keyboard is tapped. However, in some instances, the exact location of the user's tap may not be obtained through the piezo sensors 410, 412 alone. Rather, due to variation in the acoustic pulse or other unforeseen events, the piezo sensors 410, 412 may only be able to determine an approximate location on the surface 402 of the user's tap. In this circumstance, the keyboard device 400 or associated computing system may employ one or more capacitive sensors 418 in an attempt to narrow the possible area of the user's tap to a specific area or key. In another embodiment, the keyboard 400 or computing system may utilize the capacitive sensor 418 to obtain a relative area of the surface 402 that is pressed by the user and use the piezo sensors 410, 412 to obtain the proper key. Further, a capacitive sensor 418 alone may not distinguish between an accidental touch of the input surface and a deliberate one. However, by employing the piezo sensors (which may not detect an accidental brush against the input surface 402), in conjunction with the capacitive sensor 418, the input device 400 may detect and disregard accidental touches of the input devices. In this manner, the piezo sensors 410, 412 and capacitive sensors may be used in conjunction to adequately determine the key that is pressed by the user of the keyboard device 400.

In addition, the capacitive sensor 418 may also be utilized by the keyboard device 400 or computing system to determine when a user is pressing and holding a key down as the change in the capacitive field created by the user's finger is maintained as long as the user is pressing against the top surface 402. For example, to input capital letters to the computing system, the user may press and hold the "shift" key of the keyboard device 400 while typing other letters on the keyboard. However, because the piezo sensors 410, 412 detect an acoustic pulse created when a user taps on the surface 402 of the input device 400, the piezo sensors may only detect the first press and may not detect the hold movement performed by the user. Because the user's finger continues create a change in the capacitive field of the surface 402, the capacitive sensor 418 may detect the maintained presence of the user. In this manner, the capacitive sensor 418 and piezo sensors 410, 412 may be utilized in conjunction to, not only determine the location of a keystroke on the keyboard layout, but to also detect a press-and-hold movement performed by the user.

Figure 5:
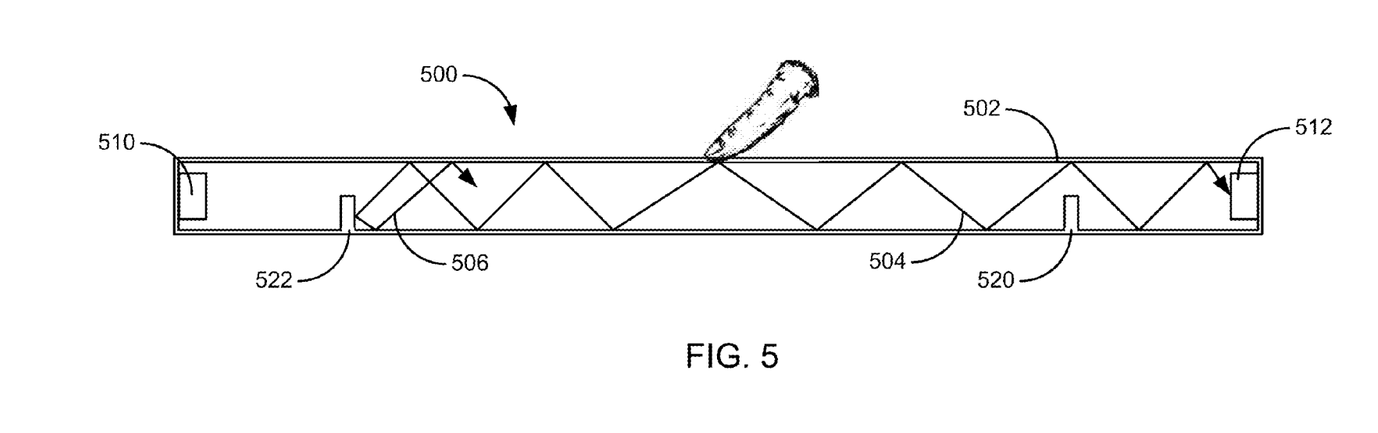
FIG. 5 depicts a cross-sectional view similar to that shown in FIG. 3 of a keyboard device utilizing acoustic pulse recognition to detect a tap on the keyboard, including tuning features to distort or alter the resultant acoustic signature of the tap.

Several other features may also be included in the keyboard device 300 to further refine the determination of a location of the user's tap on the keyboard surface 302. For example, FIG. 5 depicts a cross-sectional view similar to that shown in FIG. 3 of a keyboard device utilizing acoustic pulse recognition to detect a tap on the keyboard, including tuning features to distort or alter the resultant acoustic signature of the tap. The keyboard depicted in FIG. 5 is similar to that depicted above in FIG. 3. However, in this embodiment, one or more tuning features 520, 522 are included in the keyboard 500 to alter the acoustic signal corresponding to a tap on the surface 502.

As described above, a tap on the surface 502 of the keyboard 500 creates an acoustic pulse 504, 506 that propagates away from the tapped area. One or more piezo sensors 510, 512 located on or near the keyboard receive the acoustic pulse. The acoustic pulse signature received by each sensor is then compared to one or more databases to determine the area on the surface that is tapped. The acoustic signature for any particular tap is created as the acoustic pulse propagates along and reflects off of surfaces of the keyboard or other surfaces near the keyboard before reaching the piezo sensors 510, 512.

To further refine or alter the resultant acoustic pulse 504, 506 for any particular tap, one or more tuning features may be located between the tapped area on the surface 502 and the piezo sensors 510, 512. These tuning features may alter the propagation and reflection of the acoustic pulse 504, 506 before it reaches the piezo sensor 510, 512, essentially altering the characteristics of the acoustic pulse. Such alteration is similar to a phase encoding of sound that occurs naturally when a sound wave enters the human ear. The keyboard 500 of FIG. 5 includes two tuning features 520, 522 that project into the keyboard structure to disrupt and alter the propagation of an acoustic pulse 504, 506 resulting from tap on the surface 502. These features 520, 522 may or may not affect the propagation of a particular tap. For example, the propagation of acoustic pulse 506 is altered by tuning feature 522 in such a matter that it does not reach sensor 510, while acoustic pulse 504 is unaffected by tuning feature 520. Thus, the combined acoustic signature for the tap shown would be formed of the acoustic pulse 504 received at piezo sensor 512 and no acoustic pulse 506 received at piezo sensor 510. In reality, however, it is likely that an acoustic pulse from a tap on the surface 502 of the keyboard 500 will be received at each piezo sensor 510, 512 after several reflections off of the various surfaces of the keyboard device.

In this manner, the acoustic signature for one or more key taps may be tuned or otherwise altered by the addition or subtraction of one or more tuning features of the device. Such tuning may allow a manufacturer of the input device 500 to create truly unique acoustic signatures for one or more taps on the surface 502 of the device.

In general, the keyboard device 500 may include any number and type of tuning features that alter the propagation of an acoustic pulse. Some examples of tuning features that may alter an acoustic pulse include rough textures on the interior surface of the input device, projections extending into the propagation path of the pulse, varying dimensions of a propagation pathway, and so on. Further, the keyboard device 500 may include a combination of a plurality of the above tuning features in an attempt to alter the acoustic pulse characteristics. For example, the keyboard 500 may include a projection tuning feature combined with a rough texture on the surface of the projection to alter the acoustic signature of a particular tap on the surface 502 of the keyboard.

Figure 6:
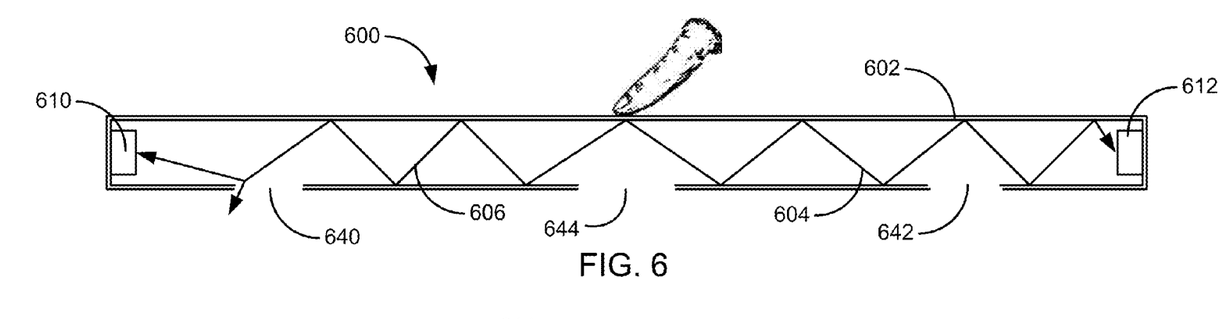
FIG. 6 depicts a cross-sectional view similar to that shown in FIG. 3 of a keyboard device utilizing acoustic pulse recognition to detect a tap on the keyboard, including openings on the surface of the keyboard to distort or alter the resultant acoustic signature of the tap.
Figure 6A:
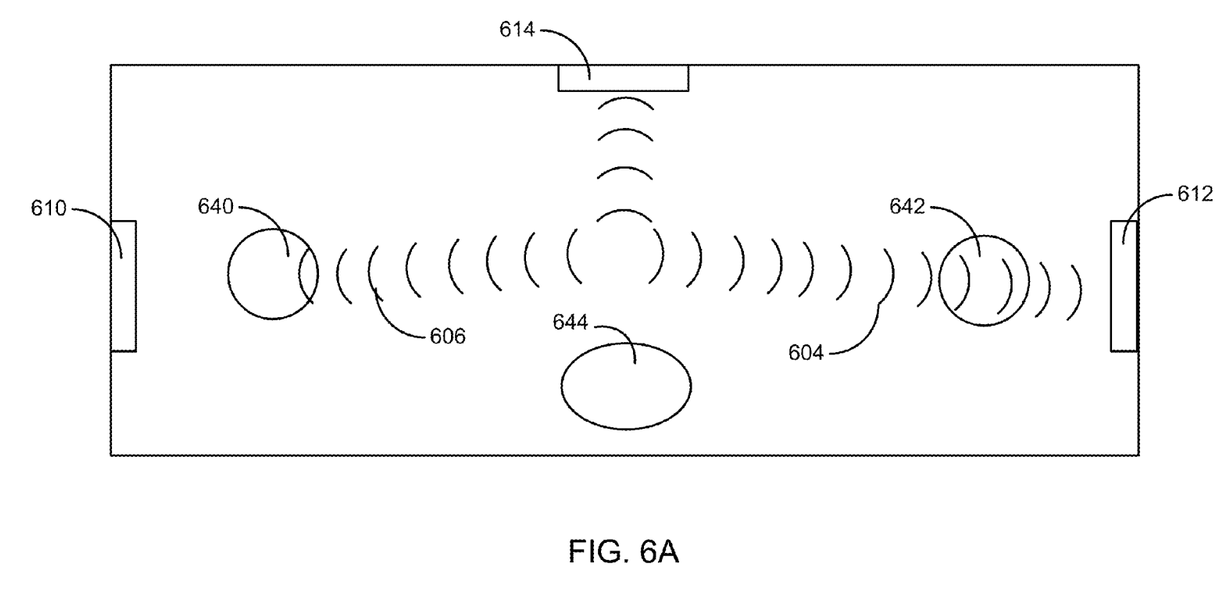
FIG. 6A depicts a cross-sectional top view similar to that shown in FIG. 3A of the keyboard device utilizing acoustic pulse recognition to detect a tap on the keyboard, including openings in the surface of the keyboard to distort or alter the resultant acoustic signature of the tap.

Another such tuning feature that may alter the acoustic pulse resulting from a tap on the surface of the keyboard device is one or more openings located along the propagation path of the acoustic pulse. FIG. 6 depicts a cross-sectional view similar to that shown in FIG. 3 of a keyboard device 600 utilizing acoustic pulse recognition to detect a tap on the keyboard, including openings 640-644 on the surface 602 of the keyboard to distort or alter the resultant acoustic signature of the tap. FIG. 6A depicts a cross-sectional top view similar to that shown in FIG. 3A of the same keyboard device 600 utilizing acoustic pulse recognition to detect a tap on the keyboard. Similar to the other tuning features described above, the openings 640-644 may alter the acoustic signature detected by the piezo sensors 610-614 created by a tap on the top surface 602 of the keyboard 600 by a user.

As described above, a tap on the surface 602 of the keyboard 600 creates an acoustic pulse 604, 606 that propagates away from the tapped area. One or more piezo sensors 610-614 located on or near the keyboard receive the acoustic pulse which is then compared to one or more databases to determine the area that is tapped.

To alter or define the acoustic signature of a tap on the keyboard surface 602, one or more openings may be located along the surfaces of the keyboard device 600. In the embodiment shown in FIG. 6, a first opening 640 is located along the bottom surface of the keyboard on the left side and a second opening 642 is located along the bottom surface of the keyboard on the right side. A third opening 644, as shown in FIG. 6A, is also located along the bottom surface of the keyboard, near the front of the keyboard device 600. Although three openings 640-644 are shown along the bottom surface of the device 600, the keyboard may include any number of openings on any of the surfaces of the keyboard. Further, while the openings shown are generally circular in shape, the openings may take any shape and size to alter or define the acoustic pulse of a tap on the surface of the keyboard.

As mentioned, the openings 640-644 may alter the propagation and reflection of the acoustic pulse 604, 606 before it reaches the piezo sensors 610, 612, altering the characteristics of the acoustic pulse. For example, the acoustic pulse 606 may split otherwise separate as it encounters the first opening 640 such that some of the pulse passes out of the opening and some of the pulse reaches the piezo sensor 610. In contrast, acoustic pulse 606 is generally unaffected by the second opening 642 as the acoustic pulse passes over the opening. In this manner, the openings along the surface of the keyboard device 600 may create a phase encoding of the acoustic pulses 604, 606 as the pulses propagate and reflect along the surfaces of the keyboard before reaching the piezo sensors 610-614.

Upon receipt, the acoustic signatures detected by the piezo sensors 610-614 of the keyboard 600 may be compared to a database of signatures by the keyboard or an associated computing system to determine the location of the tap on the surface 602 of the keyboard. In those embodiments that include tuning features 640-644 designed to alter the acoustic pulses, a database may be maintained by the input device 600 or computing system that stores such altered acoustic signatures so that the received acoustic signatures are compared to the database of altered acoustic signatures.

In addition, other environmental factors may also affect the acoustic signature of the taps along the surface of the keyboard device. For example, the user resting palms or other parts of the hand on the keyboard device while typing may alter the acoustic signature of any particular tap. To account for the effect of the user resting his hands on the keyboard device while typing, one or more pressure sensors may be included to detect pressure applied to the keyboard surface.

Figure 7:
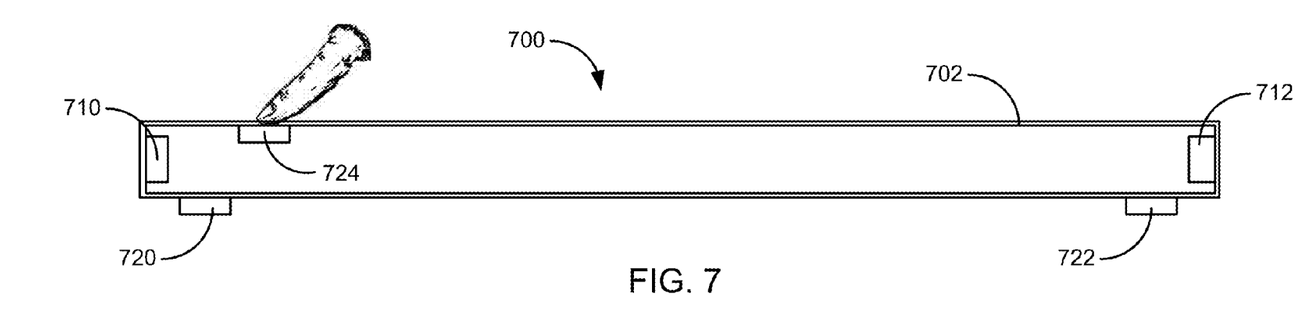
FIG. 7 depicts a cross-sectional view similar to that shown in FIG. 3 of a keyboard device utilizing a combination of piezoelectric sensors to detect a tap on the keyboard surface and pressure sensors to detect a dampening force applied to the device.
Figure 7A:
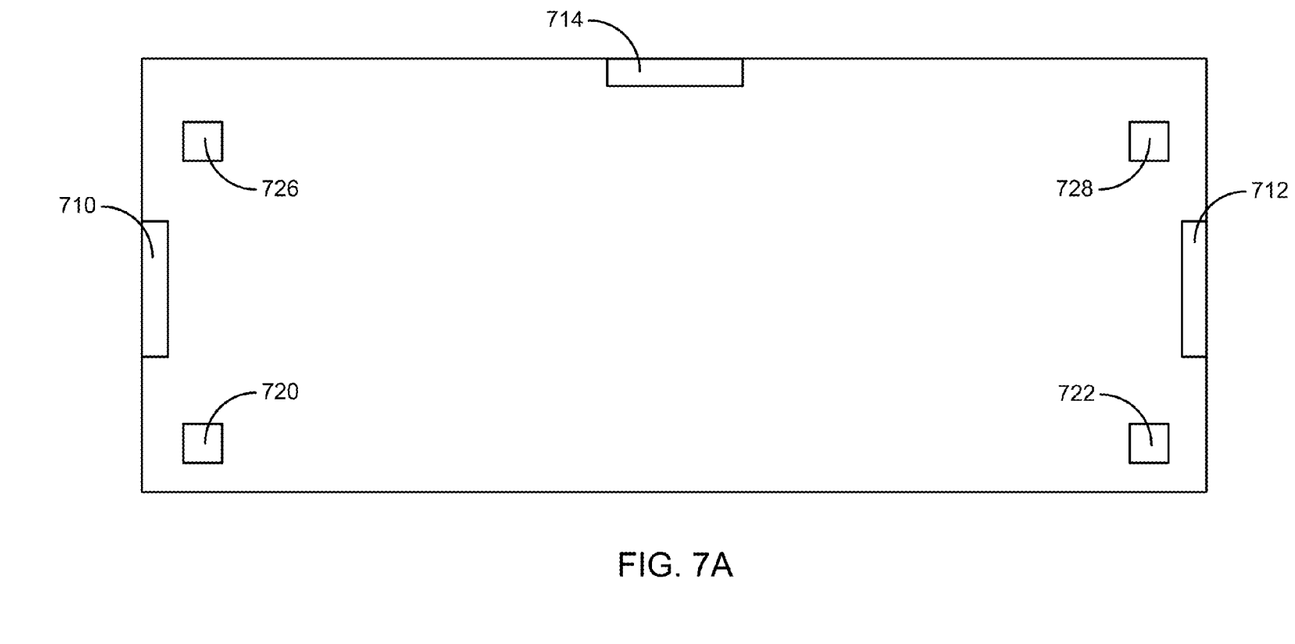
FIG. 7A depicts a bottom view of a keyboard device utilizing a combination of piezoelectric sensors and a pressure sensor to detect a tap on the keyboard surface and a dampening force applied to the device.

FIG. 7 depicts a cross-sectional view similar to that shown in FIG. 3 of a keyboard device 700 utilizing a combination of piezoelectric sensors 710, 712 to detect a tap on the keyboard surface and pressure sensors 720, 722 to detect a dampening force applied to the keyboard surface 702. FIG. 7A depicts a bottom view of the same keyboard device 700 to detect the presence of pressure on the surface of the keyboard that may dampen or alter the acoustic pulse of a tap on the keyboard surface. The pressure sensors 720-728 included may be utilized to detect the presence of a dampening force on the surface of the keyboard, as well as aid in determining the area of the surface 702 that is tapped by the user of the keyboard device 700.

To detect the presence of a dampening force, such as a user resting his palms on the surface 702 of the keyboard 700, one or more pressure switches 720, 722 may be located along the bottom surface of the keyboard. As shown in FIG. 7A, the pressure switches (720, 722, 726, 728) may be located at the four corners of the bottom surface of the keyboard device 700. However, it should be appreciated that the pressure switches may be located anywhere on the keyboard device 700 that may detect the presence of the dampening force. For example, pressure sensor 724 of FIG. 7 is located just beneath the top surface 702 of the device 700 to detect such a force. In general, the keyboard device 700 may include any number of pressure sensors located in any position on the device to detect the presence of a dampening force on the surface of the keyboard that may alter the acoustic signatures of a tap by the user.

In addition, pressure sensors 724 located just beneath the top surface 702 of the keyboard device 700 may aid the device is pinpointing the location of a tap on the surface 702. This detection may be combined with other sensor detection, such as the detection of the acoustic signature and the capacitive detection described above, to accurately locate a tap on the surface 702 of the keyboard 700 by a user. Further, the pressure sensors 724 located just beneath the surface 702 of the input device 700 may be configured to only detect and transmit a user's input if the pressure exerted exceeds a set threshold. Thus, if the input provided does not provide enough pressure to the pressure sensor 724, the input is not processed by the input device. In addition, the pressure sensors 724 may be programmed to detect different pressures applied to different segments of the input surface 702 to account for some users pressing some keys harder than others.

The embodiment shown in FIGS. 7 and 7A may also utilize a plurality of databases of acoustic signatures to compare a received acoustic signature against during operation of the keyboard 700. For example, the keyboard 700 or computing system may maintain a first database that stores a plurality of acoustic signatures for the device when no dampening force or pressure is applied to the device, other than the tap provided by the user to indicate a keystroke. However, when a dampening force is detected by one or more of the pressure sensors 720-728, a second database may be utilized that contains the acoustic signatures for the device in a damped configuration. Thus, the pressure sensors 720-728 may aid the device in selecting the correct database to compare the received acoustic signatures against to determine the location of a keystroke. Further, the detection of pressure on one pressure sensor but not the other pressure sensors of the device may trigger the accessing of a third database.

The database of dampened acoustic signatures may be created in a similar fashion as the undamped database is created. In particular, a damping force may be applied to the device 700 during a calibration phase. Then, the top surface 702 may be tapped at discrete spatial intervals while the acoustic pulse received at the piezo sensors 710-714 is stored. In this manner, each dampened individual pulse signature is associated with a particular area of the keyboard device 700. Because it is known which areas of the surface 702 of the keyboard 700 is associated with which input character, the unique damped acoustic signatures for each input character can be stored in a database accessible by the keyboard device 700 or computing system. This database may be maintained separately and accessed when the device detects a dampening pressure applied to the device 700. In an alternative embodiment, the dampened acoustic signature and undamped acoustic signature for each key of the keyboard 700 may be maintained in the same database such that the correct signature is accessed based on the environmental condition of the keyboard.

Another environmental factor that may affect the acoustic signature of a keystroke on the keyboard device is ambient noise. As should be appreciated, adding noise to the acoustic pulse created by a tap on the surface of the device likely changes the acoustic signature for that tap. Further, because the ambient noise for any particular environment may be difficult to anticipate, a database of the altered acoustic signatures for a device is similarly difficult to create. Therefore, in one embodiment, the input device may include a microphone situated to pick up the ambient noise of the environment in an effort to provide canceling techniques to remove the ambient noise from the received acoustic signatures.

Figure 8:
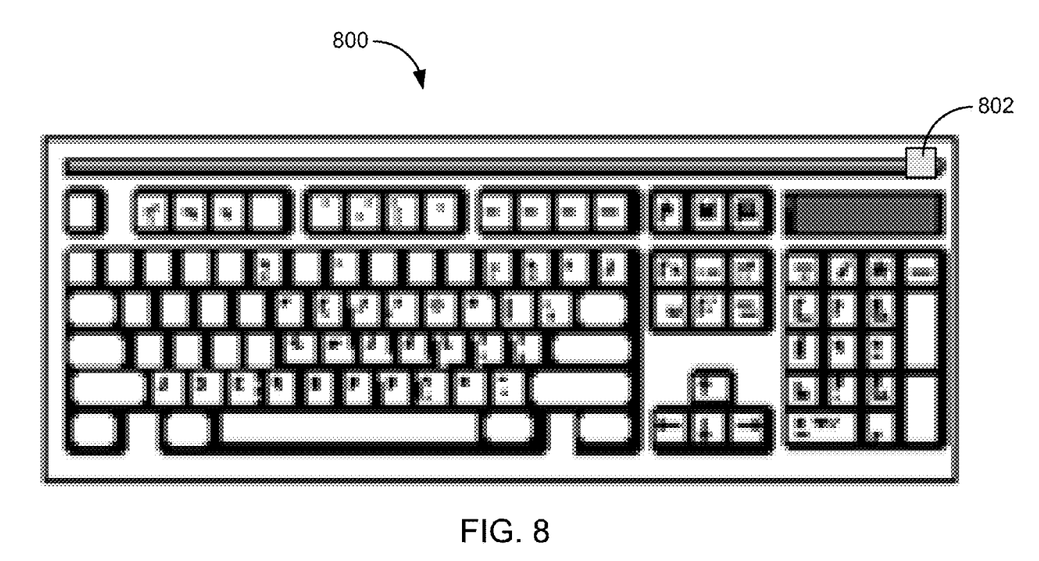
FIG. 8 depicts a top view of a keyboard device utilizing a microphone to measure ambient noise around the keyboard to aid in detecting a tap on the surface of the keyboard.

FIG. 8 depicts a top view of a keyboard device 800 utilizing a microphone 802 to measure ambient noise around the keyboard to aid in detecting a tap on the surface of the keyboard. The embodiment of the keyboard depicted in FIG. 8 is similar to the input devices described above, in that a tap performed by a user on the surface of the keyboard creates a unique acoustic signature and detected by one or more piezo sensors. However, ambient noise may alter the acoustic signature for one or more taps such that the keyboard may be unable to determine the correct location of tap on the surface of the device.

To combat the altering of the acoustic signature by ambient noise, the microphone 802 may be configured to detect the ambient noise and provide a signal to the device 800 or associated computing system that represents and mirrors the detected ambient noise. This signal may then be subtracted from the acoustic signatures detected by the piezo sensors of the keyboard 800. Thus, by removing the ambient noise from the detected acoustic signatures, the correct location of the keystroke on the surface of the keyboard device 800 is determined.

In the configuration shown, the microphone 802 is located in the upper right-hand corner of the top surface of the keyboard 800. However, the microphone 802 may be located anywhere on the keyboard that allows the microphone to detect the ambient noise. In an alternate embodiment, the microphone 802 may not located on the device itself, but may be located somewhere near the device that allows the microphone to detect the ambient noise. In general, the location of the microphone 802 does not detract from the described embodiment. Further, while only one microphone 802 is shown in FIG. 8, the device 800 may include any number of microphones or sound detecting sensors to collect a sample of the ambient noise and perform noise canceling of the present ambient noise from the resulting acoustic signatures from a tap on the surface of the keyboard device 800.

Figure 9:
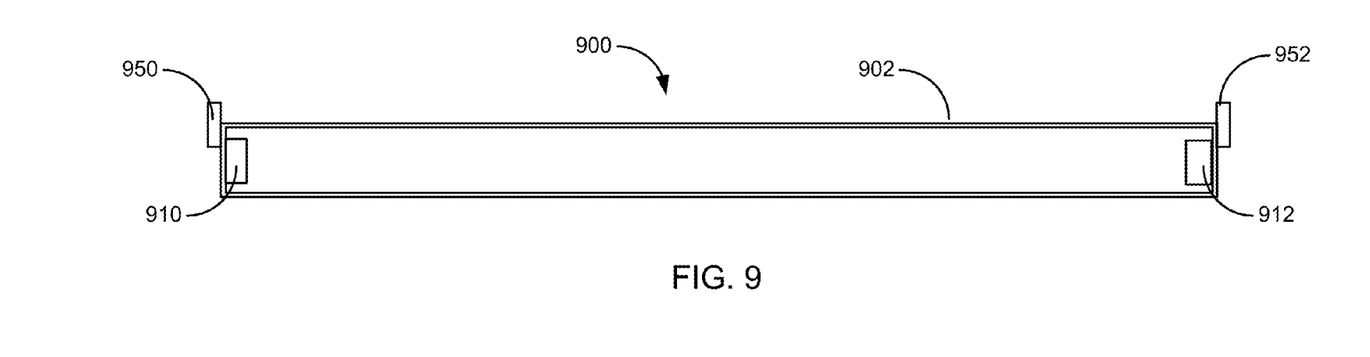
FIG. 9 depicts a cross-sectional view similar to that shown in FIG. 3 of a keyboard device utilizing a combination of piezoelectric sensors and proximity sensors to detect and locate a tap on the keyboard surface.

Yet another sensor may be included in the input keyboard device to further aid in locating the presence of a tap on the surface of the device. FIG. 9 depicts a cross-sectional view similar to that shown in FIG. 3 of a keyboard device utilizing a combination of piezoelectric sensors and proximity sensors to detect and locate a tap on the keyboard surface. Similar to the embodiment described above with reference to FIG. 4, the proximity sensors 950, 952 may be combined with the acoustic signatures detected by the piezo sensors 910, 912 to detect a tap on the surface 902 of the keyboard 900.

The proximity sensors 950, 952 may include one or more photosensors located along the edge of the keyboard device and corresponding infrared light-emitting diodes (LEDs) oriented to create a grid on the keyboard and such that the photosensors receive the light projected from the LEDs. The presence of a object may be detected by the photosensors when the object interrupts the projected light. In this manner, when a user places a finger on the surface 902 of the device 900, the proximity sensors may detect the presence of that finger.

The proximity sensors 950, 952 may be used in junction with the piezo sensors 910, 912 to provide an accurate determination of the location of a tap by the user of the input keyboard 900 device. For example, the piezo sensors 910, 912 may be used as described above to determine which area of the keyboard is tapped. However, in some instances, the exact location of the user's tap may not be obtained through the piezo sensors 910, 912 alone. In these circumstances, the keyboard device 900 or associated computing system may consult one or more proximity sensors 950, 952 in an attempt to narrow the possible area of the user's tap to a specific area or key. In addition, the proximity sensors 950, 952 may be utilized to activate and deactivate the keys or sensors of the keyboard device 900 in response to placement of the user's finger near a key. For example, when a finger is not detected near a key, such keys may be deactivated in the sense that such keys are removed from the possible keys that may be pressed by the user. However, when a finger is detected, those keys are activated. By removing some keys from the number of possible keys that are tapped by the user at any one time, the keyboard 900 may determine the correct key tap at a faster rate.

Figure 10:
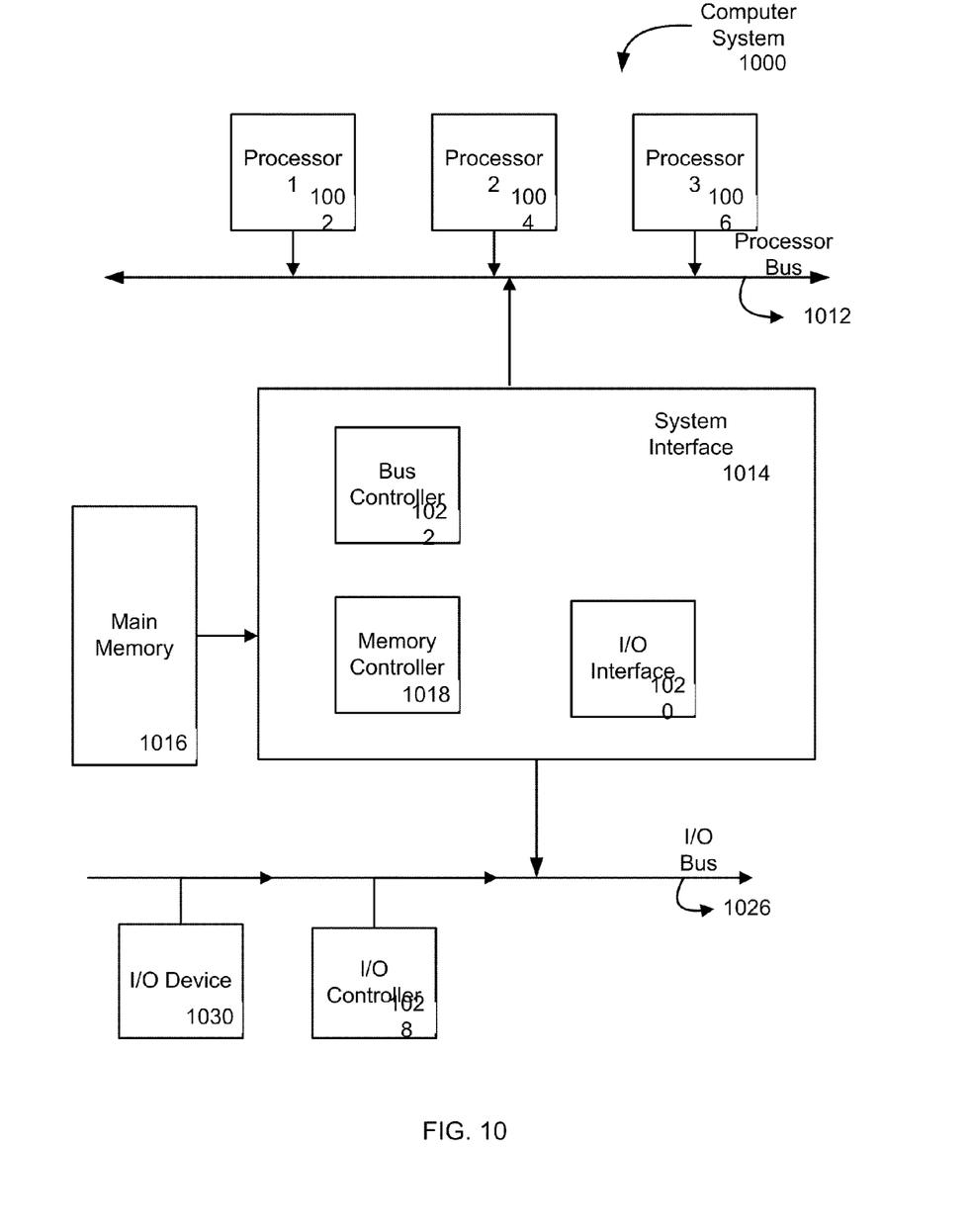
FIG. 10 is a block diagram illustrating an exemplary device or docking station which may be used in implementing embodiments of the present disclosure.

FIG. 10 is a block diagram illustrating an exemplary computing system that may be used in implementing embodiments of the present disclosure. Further, the input devices described herein may include one or more of the described components to accomplish the described functions. In addition, the computing device and docking station may omit some of the described components. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1018 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1016. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

The invention claimed is:

1. An input device for a computing system comprising:
    an input surface;
    a capacitive sensor associated with the input surface configured to detect a location of an input on the input surface;
    a piezoelectric sensor configured to detect an acoustic signature created from the input, wherein the acoustic signature is compared to a database of reference acoustic signatures to determine the location of the input on the input surface; and
    one or more pressure sensors configured to detect a dampening force applied to the input surface of the input device, wherein the sources of the dampening force and the input are different, and wherein the acoustic signature is compared to a database of dampened reference acoustic signatures to determine the location of the input on the input surface when a dampening force is applied to the input surface.

2. The input device of claim 1 further comprising:
    a second piezoelectric sensor for detecting a second acoustic signature created from the input; and
    a second database of reference acoustic signatures, wherein the second acoustic signature is compared to the second database to determine the location of the input on the input surface.

3. The input device of claim 1 further comprising:
    one or more tuning features configured to alter the acoustic signature created from the input.

4. The input device of claim 3 wherein the one or more tuning features comprise one or more openings in the input device.

5. The input device of claim 1 further comprising:
    at least one microphone configured to detect ambient noise, wherein the detected ambient noise is subtracted from the acoustic signature prior to comparison to the database of reference acoustic signatures.

6. The input device of claim 1 further comprising:
    one or more proximity sensors configured to detect the presence of an input on the input surface of the input device.

7. The input device of claim 1 wherein the database of reference acoustic signatures comprises the database of undamped acoustic signatures, the input device further comprising:
    circuitry that compares the acoustic signature to the database of undamped acoustic signatures whenever the one or more pressure sensors do not detect a dampening force applied to the input surface and that compares the acoustic signature to a database of damped acoustic signatures whenever the one or more pressure sensors detect a dampening force applied to the input surface.

8. A method for detecting an input applied to a surface of an input device of a computing system comprising:
    receiving a first acoustic pulse at a first piezoelectric sensor;
    comparing the first acoustic pulse to a first database comprising a plurality of first reference acoustic signatures;
    receiving a second acoustic pulse at a second piezoelectric sensor;
    comparing the second acoustic pulse to a second database comprising a plurality of second reference acoustic signatures, wherein the plurality of first reference acoustic signatures and the plurality of second reference acoustic signatures provide an indication of the location of the input on the surface of the input device;
    detecting a damping force applied to the surface of the input device; and
    comparing the first acoustic pulse and the second acoustic pulse to a third database comprising a plurality of damped acoustic signatures.

9. The method of claim 8 further comprising:
    detecting a change in a capacitive field on the surface of the input device in response to the input; and
    determining the location on the surface of the input by locating the change in the capacitive field.

10. The method of claim 8 further comprising:
    detecting ambient noise present near the input device; and
    subtracting the detected ambient noise from the first acoustic pulse and the second acoustic pulse.

11. The method of claim 8 further comprising:
    utilizing a proximity sensor to detect the presence of an object near the surface of the input device.

12. The method of claim 11 further comprising:
    activating at least the first piezoelectric sensor in response to detecting the presence of the object near the surface of the input device; and
    deactivating at least the first piezoelectric sensor when the presence of the object near the surface of the input device is no longer detected.

13. The method of claim 8 further comprising:
    receiving taps on the surface of the input device at discrete spatial intervals;
    storing at least the acoustic pulse resulting from the taps received at the first piezoelectric sensor in the first database; and
    associating the stored acoustic pulse with a segment of the surface of the input device corresponding to the input applied to the surface.

14. A computing system comprising:
    an input device comprising an input surface and configured to receive an input to the computing system from a user;
    a computer-readable storage device configured to store a database of reference acoustic signatures;
    a capacitive sensor configured to detect a location of the input on the input surface;
    a piezoelectric sensor configured to detect the at least one acoustic signature representing the input, wherein the detected at least one acoustic signature is compared to the database to determine the location of the input;
    a pressure sensor configured to detect a dampening force applied to the input surface of the input device, wherein the sources of the dampening force and the input are different;
    wherein the database comprises a database of undamped acoustic signatures; and circuitry that compares the detected at least one acoustic signature to the database of undamped acoustic signatures whenever the pressure sensor does not detect a dampening force applied to the input surface and that compares the detected at least one acoustic signature to a database of damped acoustic signatures whenever the pressure sensor detects a dampening force applied to the input surface.

15. The system of claim 14 further comprising:
a proximity sensor configured to detect the presence of an input on the input surface of the input device.

16. The system of claim 14 further comprising:
a microphone configured to detect ambient noise near the input device.

17. The system of claim 14 wherein the input surface comprises one or more input characters associated with one or more segments of the input surface, such that the user presses at least one of the one or more input characters to provide the input.

* * * * *